United States Patent
Yamane et al.

(10) Patent No.: US 7,316,048 B2
(45) Date of Patent: Jan. 8, 2008

(54) WIPER STRUCTURE

(75) Inventors: Hirofumi Yamane, Utsunomiya (JP); Takeshi Sasaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/169,053

(22) Filed: Jun. 28, 2005

(65) Prior Publication Data

US 2006/0000045 A1 Jan. 5, 2006

(30) Foreign Application Priority Data

Jul. 2, 2004 (JP) ............................. 2004-196652

(51) Int. Cl.
 *B60S 1/58* (2006.01)
 *B60S 1/38* (2006.01)
(52) U.S. Cl. .............................. 15/250.44; 15/250.361; 15/250.001
(58) Field of Classification Search ............. 15/250.44, 15/250.46, 250.32, 250.43, 250.361, 250.001, 15/250.3
See application file for complete search history.

(56) References Cited

U.S. PATENT DOCUMENTS

| | | | | |
|---|---|---|---|---|
| 2,876,482 A | * | 3/1959 | Oishei | ..................... 15/250.44 |
| 3,108,308 A | * | 10/1963 | Oishei | ................... 15/250.453 |
| 3,846,864 A | * | 11/1974 | Baut et al. | ................ 15/250.46 |
| 3,922,749 A | | 12/1975 | Castelman, Jr. et al. | |
| 3,969,784 A | * | 7/1976 | Journee | ................... 15/250.46 |
| 4,244,077 A | * | 1/1981 | Harbison et al. | ......... 15/250.32 |
| 4,438,543 A | | 3/1984 | Noguchi et al. | |

FOREIGN PATENT DOCUMENTS

| | | |
|---|---|---|
| FR | 2232202 | 12/1974 |
| FR | 2499486 | 8/1982 |
| FR | 2681028 | 3/1993 |
| FR | 2798341 | 3/2001 |
| JP | H1-178168 | 12/1989 |
| JP | 2002-326513 | 11/2002 |
| JP | 2003-165422 | 6/2003 |

* cited by examiner

*Primary Examiner*—Gary K. Graham
(74) *Attorney, Agent, or Firm*—Carrier, Blackman & Associates, P.C.; William D. Blackman; Joseph P. Carrier

(57) ABSTRACT

A wiper structure for a window glass, includes a wiper arm comprising a support arm provided on the wiper arm; and a wiper blade comprising a blade main body, the wiper blade being supported on the wiper arm in an asymmetrical manner about a connecting point, the wiper blade main body being supported at a plurality of support points on the support arm, wherein a spacing between any two adjacent support points of the plurality of support points is set wider as a curvature of the window glass increases.

8 Claims, 4 Drawing Sheets

WIPER STRUCTURE

BACKGROUND OF THE INVENTION

1. Field of the Invention

The present invention relates to a wiper structure wherein a wiper blade is supported on a wiper arm in an asymmetrical manner about a connecting point.

Priority is claimed on Japanese Patent Application No. 2004-196652, filed Jul. 2, 2004, the content of which is incorporated herein by reference.

2. Background Art

One type of a wiper apparatus provided on a vehicle, such as an automobile, is a wiper apparatus in which wiper blade having a plurality of support arms of tournament structure is supported on a wiper arm, for example. This wiper apparatus is for ensuring a field of front or rear vision of the vehicle by turning the wiper arm while being pressed, to thereby wipe the window glass by the blade main body of the wiper blade (refer to Japanese Unexamined Patent Application, First Publication No. 2003-165422).

In the above conventional wiper apparatus, because it is necessary to apply the pressing force evenly on the window glass (windshield), the wiper blade is supported on the wiper arm in a symmetrical manner about the connecting point, and the spacings of support points for supporting the blade main body are made as constant as possible.

Recently, for reasons of vehicle body design, a curved shape has been employed for the front window glass and the rear window glass. In such a case, the wiping performance by the wiper blade in a wiper structure that evenly applies the pressing force as mentioned above, is greatly affected by the shape of the window glass.

For example, when a window glass having a portion which is greatly curved, is wiped, the pressing force on the curved portion is increased or decreased compared to the other portions. Therefore, there is a problem of decreased wiping effect in the vicinity of the curved portion.

To address this, it has been considered to use other parts, in order to change the pressing force locally. However, the wiping performance may be deteriorated as the weight is increased.

SUMMARY OF THE INVENTION

Accordingly, it is an object of the present invention to provide a wiper structure that has an excellent wiping effect even if there is a large curvature portion in a window glass.

In order to achieve the above object, a first aspect of the present invention is a wiper structure for a window glass, including: a wiper arm including a support arm provided on the wiper arm; and a wiper blade including a blade main body, the wiper blade being supported on the wiper arm in an asymmetrical manner about a connecting point, the wiper blade main body being supported at a plurality of support points on the support arm, wherein a spacing between any two adjacent support points of the plurality of support points is set wider as a curvature of the window glass increases.

By such a configuration, the large curvature portion of the window glass corresponds to the side having a wide spacing with less support points and excellent fittingness, and due to the elastic force of the blade main body, the curved form of the window glass can be fitted without being obstructed by the support points.

A second aspect of the present invention is a tournament-type wiper structure for a window glass, including: a wiper arm including a support arm provided on the wiper arm; and a wiper blade including a blade main body, the wiper blade being supported on the wiper arm in an asymmetrical manner about a connecting point, the wiper blade main body being supported at a plurality of support points on the support arm, wherein the number of levels in the tournament is set smaller as a curvature of the window glass increases.

By having such a configuration, if the large curvature portion of the window glass corresponds to the portion for which the number of levels in the tournament of the wiper blade is lower, and which has a greater depth, a larger bend stroke can be ensured in the height direction of the blade main body according to the curvature of the window glass, so that the large curvature portion can be fitted.

A third aspect of the present invention is a tournament-type wiper structure for a window glass, including: a wiper arm including a support arm provided on the wiper arm; and a wiper blade including a blade main body, the wiper blade being supported on the wiper arm in an asymmetrical manner about a connecting point, the wiper blade main body being supported at a plurality of support points on the support arm, wherein the number of levels in the tournament is set smaller as a curvature of the window glass increases, and a spacing between any two adjacent support points of the plurality of support points is set wider for the large curvature portion of the window glass.

By having such a configuration, if the large curvature portion of the window glass corresponds to the portion for which the number of levels in the tournament of the wiper blade is lower, and which has a greater depth, a larger bend stroke can be ensured in the height direction of the blade main body according to the curvature of the window glass, so that the large curvature portion can be fitted. Furthermore, if the large curvature portion of the window glass corresponds to the side having a wide spacing with less support points and excellent fittingness, then due to the elastic force of the blade main body, the curved form of the window glass can be fitted without being obstructed by the support points.

According to a fourth aspect of the present invention, in the wiper blade described above, the wiper blade is set such that a length from the connecting point is shorter on a side having a greater curvature of the window glass.

By having such a configuration, the pressing force per a unit length on the large curvature portion of the window glass can be increased.

According to the first aspect of the present invention, the large curvature portion of the window glass corresponds to the side having a wide spacing with less support points and excellent fittingness, and due to the elastic force of the blade main body, the curved form of the window glass can be fitted without being obstructed by the support points. Therefore, even in a portion having a partially large curvature, this curvature can be fitted, so that there is an effect of being able to increase the wiping effect. Moreover, since no special member is required for changing the pressing force of the wiper blade to match with the curved form, the wiper apparatus can be lightened.

According to the second aspect of the present invention, if the large curvature portion of the window glass corresponds to the portion for which the number of levels in the tournament of the wiper blade is lower, and which has a greater depth, a larger bend stroke can be ensured in the height direction of the blade main body according to the curvature of the window glass, so that the large curvature portion can be fitted. Therefore, even in a portion having a partially large curvature, the blade main body can increase the bent stroke and follow with enough margin, so that there is the effect of being able to increase the wiping effect.

Moreover, since no special member is required for changing the pressing force of the wiper blade, the wiper apparatus can be lightened.

According to the third aspect of the present invention, if the large curvature portion of the window glass corresponds to the portion for which the number of levels in the tournament of the wiper blade is lower, and has a greater depth, a larger bend stroke can be ensured in the height direction of the blade main body according to the curvature of the window glass, so that the large curvature portion can be fitted. Furthermore, if the large curvature portion of the window glass corresponds to the side having a wide spacing with less support points and an excellent fittingness, then due to the elastic force of the blade main body, the curved form of the window glass can be fitted without being obstructed by the support points. Therefore, even in a portion having a partially large curvature, there is an effect of being able to further increase the wiping effect. Moreover, since no special member is required for changing the pressing force of the wiper blade, the wiper apparatus can be lightened.

According to the fourth aspect of the present invention, the pressing force per a unit length on the large curvature portion of the window glass can be increased. Hence, there is an effect of being able to reliably wipe without leaving a trace.

DETAILED DESCRIPTION OF THE INVENTION

Hereunder is a description of an embodiment of the present invention, with reference to drawings.

Figure 1:
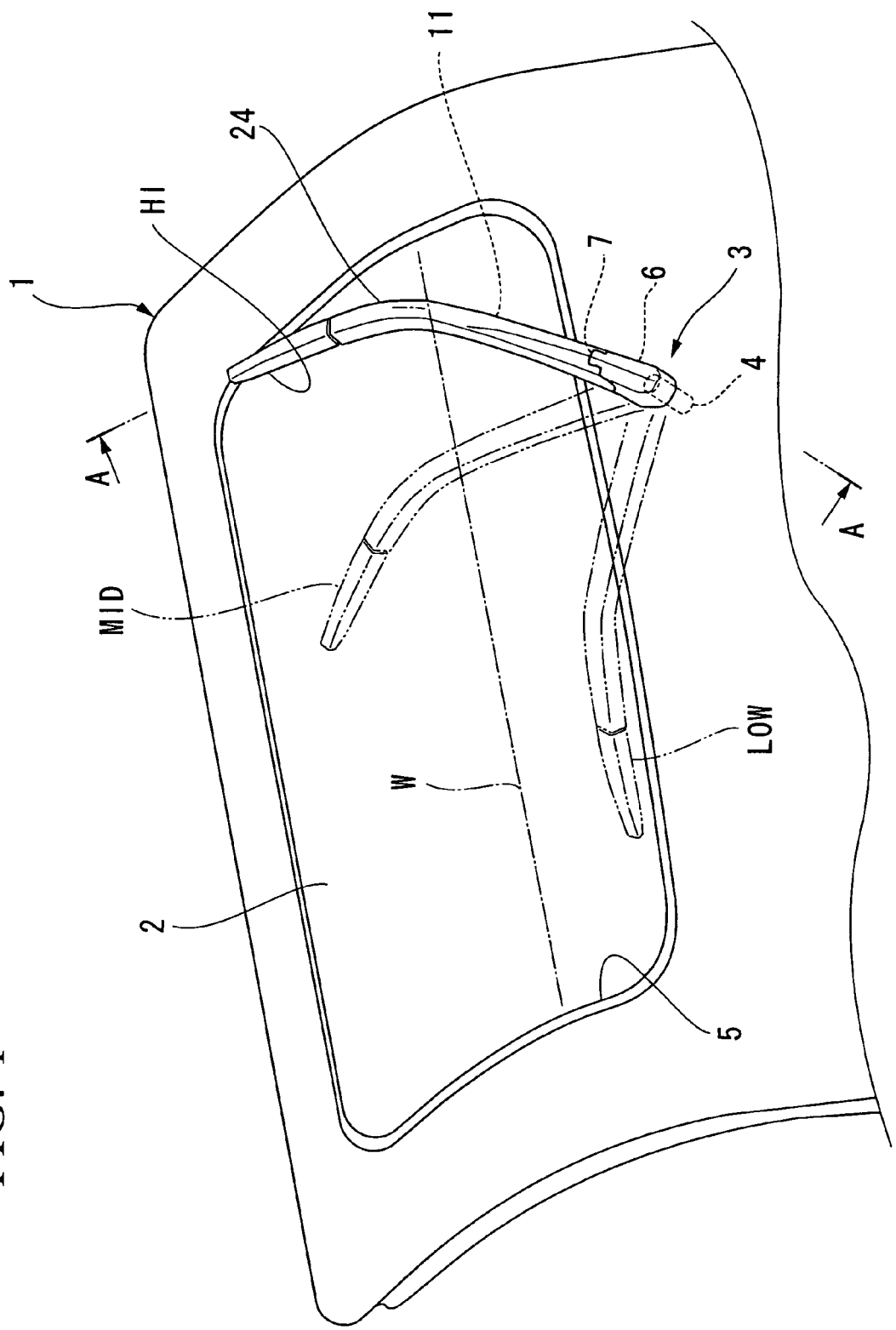
FIG. 1 is a partial perspective view of a tailgate furnished with a wiper structure of an embodiment of the present invention.

As shown in FIG. 1, a wiper apparatus 3 which wipes a rear window glass 2 is provided on a tailgate 1 that is the back door of a vehicle. The wiper apparatus 3 is linked to a pivot shaft 4 which is rotated by a drive unit (not shown). This pivot shaft 4 is provided in the vicinity of the lower side of a glass installation opening 5 of the tailgate 1.

Figure 2:
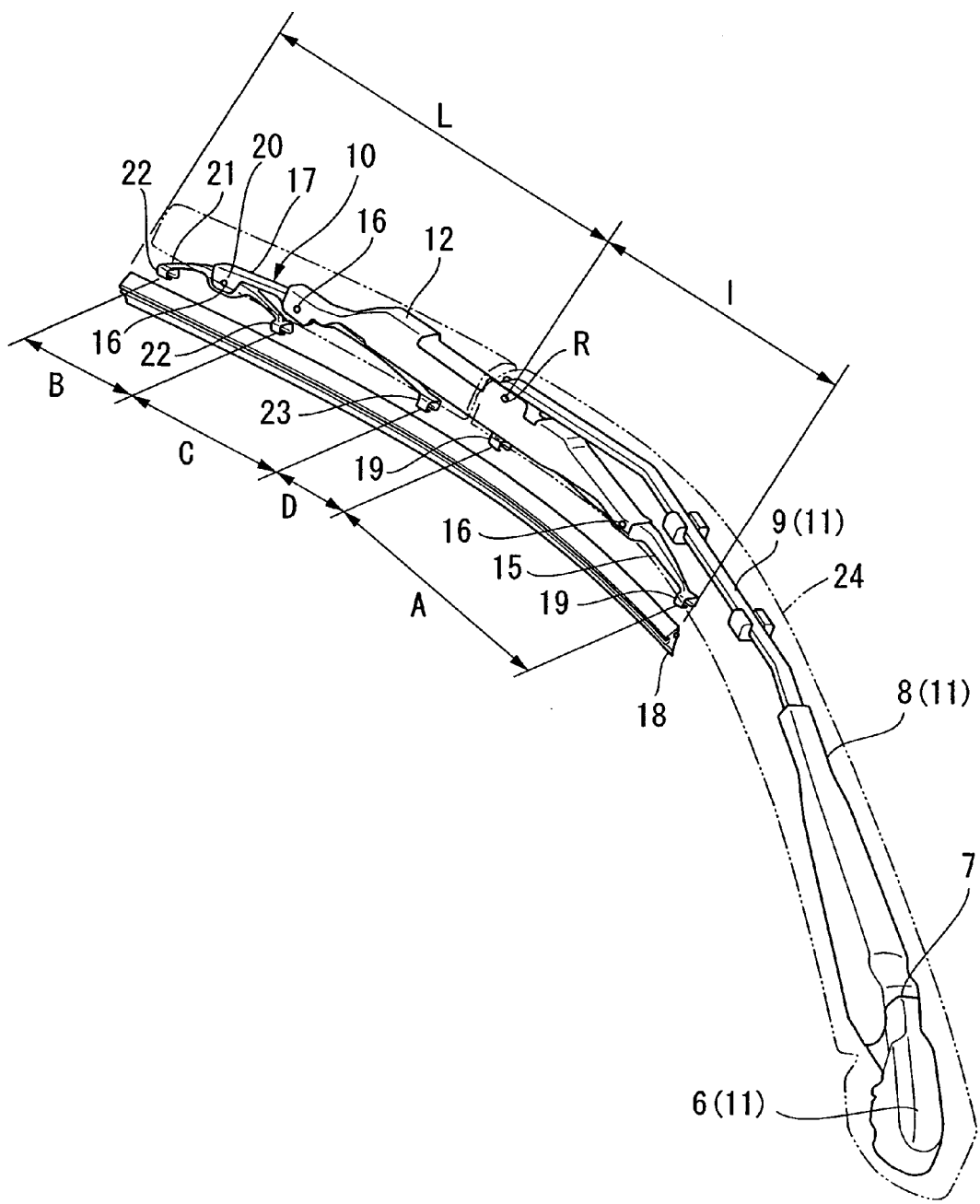
FIG. 2 is an assembled perspective view of a wiper apparatus of the embodiment of the present invention.
Figure 3:
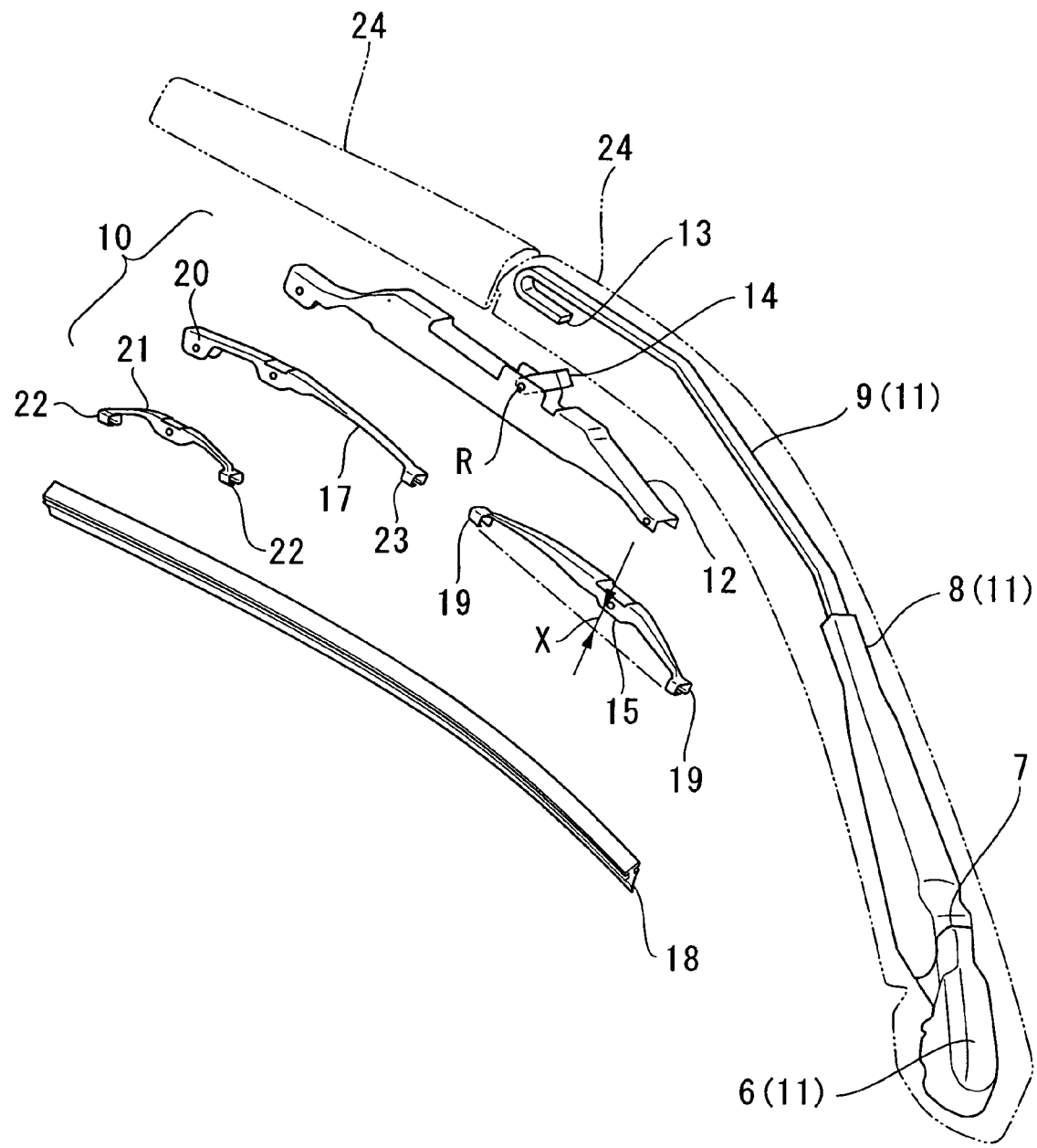
FIG. 3 is an exploded perspective view of the wind wiper apparatus shown in FIG. 2.

As shown in FIG. 2 and FIG. 3, an arm base 6 is attached to the pivot shaft 4, and a shank 8 having a U-shaped cross-sectional is elastically supported on the arm base 6 via a hinge 7 so as to be able to stand up. An arm piece 9 with the tip thereof bent to the left as shown in FIG. 1, is fixed to a tip portion of the shank 8, and a wiper blade 10 is swingably supported on the tip of the arm piece 9. The arm base 6, the shank 8, and the arm piece 9 constitute a wiper arm 11 of the wiper apparatus 3.

A tournament-type wiper blade 10 is detachably attached to the tip of the arm piece 9. Specifically, the wiper blade 10 includes a primary arm 12 which is latched to a U-shaped portion 13 at the tip of the arm piece 9. The primary arm 12 has a proximal end closer to the arm base 6 and a distal end spaced away from the arm base 6. A latch 14 is swingably supported on the approximate central portion of the primary arm 12 so that the U-shaped portion 13 at the tip of the arm piece 9 can be fastened to this latch 14. The support portion of the primary arm 12 and the latch 14 constitutes a connecting point R.

Here, the primary arm 12 is set such that, centered on the connecting point R, the wiper arm 11 base side length of the primary arm 12 is shorter than the tip side length. Moreover, a first secondary arm (support arm) 15 is swingably supported on the wiper arm 11 base end of the primary arm 12 by a pin 16. The first secondary arm (support arm) 15 has a substantially arcuate shape, as shown, and is outwardly bowed at a central portion thereof. A second secondary arm (support arm) 17 is swingably supported on the wiper arm 11 tip end by another pin 16. Each of the first and second secondary arms 15, 17, respectively, has a proximal end closer to the arm base 6 and a distal end spaced away from the arm base 6. Furthermore, claws (support points) 19 which slidably support a blade main body 18, are provided on the opposite ends of the first secondary arm 15.

On the other hand, a yoke support portion 20 is formed on the wiper arm 11 tip end of the second secondary arm 17, and a yoke (support arm) 21 is swingably supported thereon by another pin 16. Claws (support points) 22 which slidably support the blade main body 18 are provided on the opposite ends of the yoke 21. The yoke (support arm) 21 also has a substantially arcuate shape, as shown, and is outwardly bowed at a central portion thereof. A claw (support point) 23 which slidably supports the blade main body 18 is also provided on the wiper arm 11 base end of the second secondary arm 17. The primary arm 12, the first and second support arms 19, 20 and the yoke 22 cooperate to define a wiper blade support structure which extends between the main blade body 18 and the wiper arm 11.

Furthermore, the blade main body 18 is slidably supported on the two claws 19 on the opposite ends of the first secondary arm 15, the claw 23 on the wiper arm 11 base end of the second secondary arm 17, and the two claws 22 of the yoke 21. Here, one end of the blade main body 18 is fastened to and restrained by either one of the claw 22 on the outer end of the yoke 21 and the claw 19 on the wiper arm 11 base end of the first secondary arm 15, so that when the blade main body 18 is bent and deformed at the time of wiping by the wiper apparatus 3, it can relatively slide on the portion of the plurality of non-restraining claws by using a margin maintained at the unrestrained end.

Figure 4:
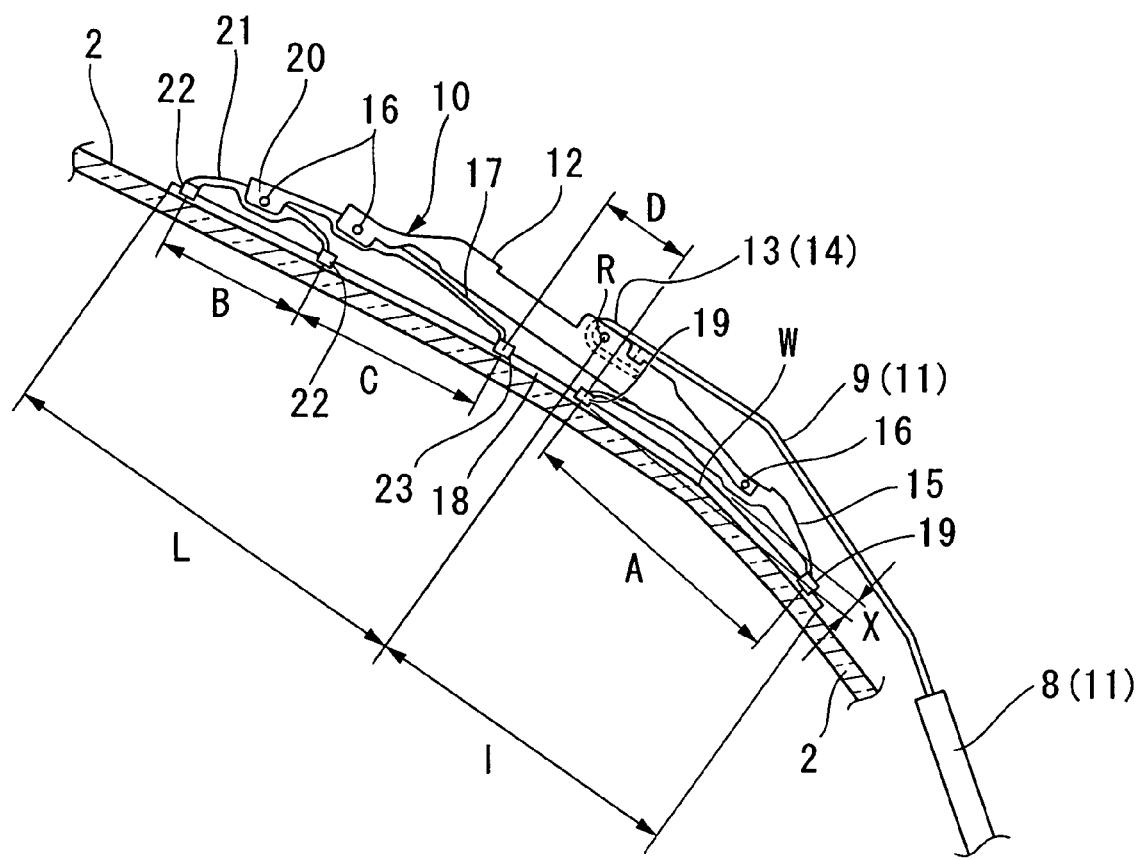
FIG. 4 is a cross-sectional view taken along the line A-A of FIG. 1.

As shown in FIGS. 1 and 4, the rear window glass 2 is formed so that, at a point which is slightly lower than the center in the vertical direction, the vertical curvature of the glass increases in a configuration which extends across the glass in a vehicle widthwise direction, and the lower portion of the glass is curved sharply downward. The wiper arm 11 moves to wipe so as to transverse this large curvature portion W, and the length of the wiper arm 11 is set so that the large curvature portion W of the rear window glass 2 is positioned between the claws 19 of the first secondary arm 15. Moreover, the wiper blade 10 is supported in an asymmetrical manner about the connecting point R, with the length from the connecting point R to the respective ends set such that the length (length I) to the end on the side corresponding to the large curvature portion W of the rear window glass 2 is shorter than the length (length L) on the side corresponding to the small curvature portion of the rear window glass 2 (L>I).

Furthermore, assuming that the spacing between the respective claws 19 of the first secondary arm 15 is A, the spacing between the respective claws 22 of the yoke 21 is B, the spacing between the claw 22 on the wiper arm 11 base side of the yoke 21 and the claw 23 of the second secondary arm 17 is C, and the spacing between the claw 23 of the second secondary arm 17 and the claw 19 on the wiper arm 11 tip side of the first secondary arm 15 is D, the spacing A between the respective claws 19 of the first secondary arm 15 is set so as to be the greatest corresponding to the magnitude of the curvature of the rear window glass 2 (A>B, C, D).

Here, the reason why the spacing between the respective claws is set corresponding to the curvature of the rear window glass 2 is that when the curvature of the rear window glass 2 is large, then in order to bend the blade main body 18 for that large amount, it is necessary to make the spacing between the respective claws as large as possible so that the blade main body 18 can be bent with enough margin.

Moreover, in order to bend the blade main body 18 in such a manner, a space for bending the blade main body 18 is required. In this embodiment, the spacing A between the respective claws 19 of the first secondary arm 15 is set so as to be greater than for the other spacings, so that the blade main body 18 can be readily bent. Moreover, enough bend space X for the blade main body 18 is ensured in the height direction of the wiper blade 10, between the claws 19 of the first secondary arm 15 for which the number of levels in the tournament without the yoke 21 is low. That is, the first secondary arm 15 has a deeper space than the yoke 21, and hence the bend space of the blade main body 18 can be kept larger.

As shown by chain lines in FIG. 2 and FIG. 3, a cover member 24 which covers the exterior of the tip side of the wiper blade 10 is provided on the wiper arm 11.

Next is a description of the operation of the wiper structure of the present invention.

As shown in FIG. 1, when the wiper arm 11 is turned back and forth from the lower position LOW to the higher position HI to wipe the rear window glass 2, the blade main body 18 can wipe the rear window glass 2 so that it moves in parallel with this large curvature portion W until it reaches the large curvature portion W of the rear window glass 2. However, once it starts to pass through the large curvature portion W, although this large curvature portion W is not curved enough to bend the blade main body 18 at the beginning of passing, the blade main body 18 is gradually turned to a direction crossing over the large curvature portion W and it is gradually bent.

However, as shown in FIG. 4, even if the wiper blade 10 reaches the position MID which crosses over the large curvature portion W at right angles, the blade main body 18 which is sufficiently bent with enough margin between the claws 19 of the first secondary arm 15 can touch on the large curvature portion W, so that wiping can be performed with no trace left. At this time, the blade main body 18 can wipe the large curvature portion W of the rear window glass 2 by corresponding to the spacing between the claws 19 of the first secondary arm 15 for which the number of levels in the tournament is smaller and has a greater depth than the yoke 21. Accordingly, enough bend space X is also ensured in the height direction of the blade main body 18, so that the blade main body 18 can be smoothly bent.

Additionally, the pressing force on the wiper blade 10 is distributed about the connecting point R. However, the wiper blade 10 is set as a whole such that the length from the connecting point R on the side corresponding to the large curvature portion W of the rear window glass 2 is shorter than the length on the side corresponding to the small curvature portion. Therefore, the pressing force on the large curvature portion W per a unit length is increased accordingly, so that the large curvature portion W of the rear window glass 2 can be wiped with no trace left.

According to the above embodiment, the large curvature portion W of the rear window glass 2 corresponds to the first secondary arm 15 including the claws 19 having a wide spacing with less support points and an excellent fittingness, and due to the elastic force of the blade main body 18, the curved form of the rear window glass 2 can be touched without being adversely affected by the claws 19. Therefore, the wiping effect can be increased even in the large curvature portion W of the rear window glass 2 where traces tend to be left. Moreover, since no extra member is required for changing the pressing force of the wiper blade 10, it is possible to reduce the weight of the wiper apparatus 3.

Furthermore, the spacing between the respective claws 19 of the first secondary arm 15, for which the number of levels in the tournament of the wiper blade 10 is lower, and which has a greater depth, can be made to correspond to the large curvature portion W of the rear window glass 2, and a larger bend space X can be ensured in the height direction of the blade main body 18 compared to the portion supported by the yoke 21, so that the large curvature portion W can be touched. Therefore, the present invention is advantageous in that even in the large curvature portion W of the rear window glass 2, the wiping effect, where the blade main body 10 is largely bent with enough margin and touches the window glass, can be increased.

Furthermore, in this embodiment, the wide spacing region between the claws 19 of the first secondary arm 15, is set corresponding to rear window glass 2 so as to span over the large curvature portion W. Therefore, this, together with ensuring the bend space X as mentioned above, enhances the wiping effect even in the large curvature portion W with no trace left.

The present invention is not limited to the above embodiment. The tournament structure of the abovementioned structure is an example and is not to be considered as limiting. Moreover, although the rear window glass 2 was described as an example, the present invention can be applied to a wiper apparatus for a front window glass.

In the above, a preferred embodiment has been described, however the present invention is not limited to this embodiment. Additions, omission, substitutions of the construction, and other modifications can be made without departing from the spirit or scope of the present invention. Accordingly, the invention is not to be considered as being limited by the forgoing description, and is only limited by the scope of the appended claims.

What is claimed is:

1. In combination, a door panel and a wiper structure for a window glass, said combination comprising:
    said door panel configured to fit on a vehicle and having an opening formed therein;
    a curved window glass adapted to fit inside the opening, wherein said window glass includes a large curvature portion;
    a wiper arm;
    a support arm provided on the wiper arm; and
    a wiper blade comprising a blade main body, the wiper blade being operatively supported on the wiper arm about a connecting point, the wiper blade main body being supported at a plurality of support points on the support arm,
    wherein a spacing between any two adjacent support points of the plurality of support points is set wider as a curvature of the window glass increases, wherein a portion where the curvature of the window glass is large is formed across the widthwise direction of the vehicle, the vertical curvature increases across the widthwise direction of the vehicle, and the lower portion is curved sharply downward, and wherein said wiper blade support arm is configured such that during operation, when the wiper blade reaches a position which crosses over the large curvature portion of the window glass at right angles, a bend space is kept in the height direction of the blade main body.

2. A combined door panel and wiper structure according to claim 1, wherein the wiper blade is supported on the wiper arm in an asymmetrical manner about the connecting point, and wherein the wiper blade is set such that a length from the connecting point is shorter on a side having a greater curvature of the window glass.

3. In combination, a door panel and a tournament-type wiper structure for a window glass, said combination comprising:

said door panel configured to fit on a vehicle and having an opening formed therein;

a curved window glass adapted to fit inside the opening, wherein said window glass includes a large curvature portion;

a pivot shaft;

a wiper arm connected to the pivot shaft;

a support arm provided on the wiper arm; and a wiper blade comprising a blade main body, the wiper blade being operatively supported on the wiper arm about a connecting point, the wiper blade main body being supported at a plurality of support points on the support arm, wherein the number of levels in the tournament is set smaller as a curvature of the window glass increases, and wherein a portion where the curvature of the window glass is large is formed across the widthwise direction of the vehicle, the vertical curvature increases across the widthwise direction of the vehicle, and the lower portion is curved sharply downward, and wherein when the wiper blade reaches the position which crosses over the large curvature portion of the window glass at right angles, a bend space is kept in the height direction of the blade main body.

4. A combined door panel and wiper structure according to claim 3, wherein the wiper blade is supported on the wiper arm in an asymmetrical manner about the connecting point, and wherein the wiper blade is set such that a length from the connecting point is shorter on a side having a greater curvature of the window glass.

5. In combination, a door panel and a tournament-type wiper structure for a window glass, said combination comprising:

said door panel configured to fit on a vehicle and having opening formed therein;

a curved window glass adapted to fit inside the opening, wherein said window glass includes a large curvature portion;

a wiper arm comprising a support arm provided on the wiper arm; and a wiper blade comprising a blade main body, the wiper blade being supported on the wiper arm about a connecting point, the wiper blade main body being supported at a plurality of support points on the support arm, wherein the number of levels in the tournament is set smaller as a curvature of the window glass increases, and a spacing between any two adjacent support points of the plurality of support points is set wider for the large curvature portion of the window glass, and wherein a portion where the curvature of the window glass is large is formed across the widthwise direction of the vehicle, the vertical curvature increases across the widthwise direction of the vehicle, and the lower portion is curved sharply downward, and wherein when the wiper blade reaches the position which crosses over the large curvature portion of the window glass at right angles, a bend space is kept in the height direction of the blade main body.

6. A combined door panel and wiper structure according to claim 5, wherein the wiper blade is supported on the wiper arm in an asymmetrical manner about the connecting point, and wherein the wiper blade is set such that a length from the connecting point is shorter on a side having a greater curvature of the window glass.

7. A rear door panel assembly for a vehicle, said rear door panel assembly comprising:

a door panel having an opening formed therein, a curved window glass adapted to fit inside the opening of said door panel, said window glass comprising a large curvature portion;

a pivot shaft operatively attached to the door panel; and a wiper apparatus, comprising:

a wiper arm connected to the pivot shaft, a wiper blade support structure attached to the wiper arm; and a wiper blade comprising a blade main body, the wiper blade being operatively supported on the wiper arm by the wiper blade support structure, the blade main body being supported at a plurality of support points on the wiper blade support structure, wherein the wiper blade support structure comprises:

a primary arm pivotally attached to said wiper arm, said primary arm having a proximal end and a distal end;

a first support arm pivotally connected to the proximal end of the primary arm at a pivot connection, said first support arm having an outwardly bowed substantially arcuate shape and having a respective support point for supportingly receiving a portion of the wiper blade therethrough at each end thereof;

a second support arm pivotally connected to the distal end of the primary arm, said second support arm having a proximal end and a distal end, said proximal end of the second support arm having a support point thereon for supportingly receiving a portion of the wiper blade therethrough; and a yoke which is pivotally attached to the distal end of said second support arm, said yoke having an outwardly bowed substantially arcuate shape and having a respective support point for supportingly receiving a portion of the wiper blade therethrough at each end thereof;

and wherein the large curvature portion of the window glass extends across the window glass in a widthwise direction of the door panel, and the lower portion of the window glass extends sharply downward from the large curvature portion, and wherein said wiper blade support structure is configured such that during operation, when the wiper blade crosses over the large curvature portion of the window glass, a bend space is maintained between an outer surface of the main blade body and an inner surface of the first support arm at an area thereof proximate the pivot connection between the primary arm and the first support arm.

8. A rear door panel assembly according to claim 7, wherein the wiper blade is set such that a length from the connecting point is shorter on a side having a greater curvature of the window glass, and wherein the wiper blade is supported about the connecting point on the wiper arm in an asymmetrical manner.

* * * * *